United States Patent [19]

Bühler

[11] Patent Number: 5,216,140
[45] Date of Patent: Jun. 1, 1993

[54] MONOAZO DYE AND PREPARATION AND USE THEREOF

[75] Inventor: Ulrich Bühler, Alzenau, Fed. Rep. of Germany

[73] Assignee: Cassella Aktiengesellschaft, Frankfurt am Main, Fed. Rep. of Germany

[21] Appl. No.: 931,106

[22] Filed: Aug. 17, 1992

Related U.S. Application Data

[63] Continuation of Ser. No. 716,220, Jun. 17, 1991, abandoned.

[30] Foreign Application Priority Data

Jun. 25, 1990 [DE] Fed. Rep. of Germany ....... 4020117

[51] Int. Cl.$^5$ .................................... C07C 245/00
[52] U.S. Cl. .................................... 534/856; 534/597
[58] Field of Search .................................... 534/856, 597

[56] References Cited

U.S. PATENT DOCUMENTS 3,968,099  7/1976  Leverenz .
4,126,610  11/1978  Belfort .
4,165,297  8/1979  Belfort .
4,289,694  9/1981  Belfort .
4,348,319  9/1982  Hamprecht .................. 534/856

FOREIGN PATENT DOCUMENTS 1-297467  11/1989  Japan .................................. 534/856
A12028361  3/1980  United Kingdom .
B22028361  10/1982  United Kingdom .
2108141  5/1983  United Kingdom ................ 534/856

Primary Examiner—Alan Siegel
Attorney, Agent, or Firm—Connolly and Hutz

[57] ABSTRACT

The monoazo dye of the formula

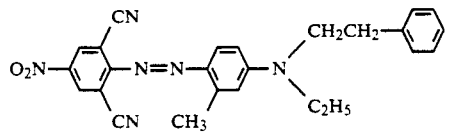

is highly suitable for dyeing and printing hydrophobic fibres.

1 Claim, No Drawings

MONOAZO DYE AND PREPARATION AND USE THEREOF

This application is a continuation of application Ser. No. 07/716,220 filed Jun. 7, 1991, now abandoned.

The present invention relates to the useful monoazo dye of the formula I

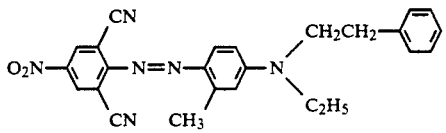

to the preparation thereof and to the use thereof for dyeing hydrophobic fiber materials.

Monoazo dyes of the general formula II

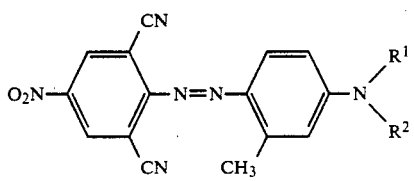

with various radicals $R^1$ and $R^2$ are already known. For instance, the dye where $R^1$ and $R^2$ are each $C_2H_5$ is described in DOS 2,834,386 and the dye where $R^1$ is n—$C_4H_9$ and $R^2$ is $(CH_2)_2OCOCH_3$ is described in GM 2,030,169. The dyes where $R^1$ is $CH_2CH=CH_2$ and $R^2$ is $(CH_2)_2CN$ or where $R^1$ is $CH=C(CH_3)_2$ and $R^2$ is $(CH_2)_2COOCH_3$ can be found in GB 1,313,209. DOS 1,962,402 lists the dye of the formula

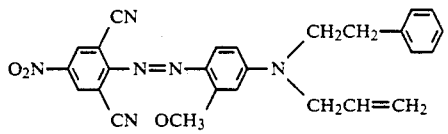

The dyes nearest to the dye of the present invention are the two dyes of the formula II where $R^1$ is $CH_2C_6H_5$ and $R^2$ is $C_2H_5$ or $R^1$ is $(CH_2)_3C_6H_5$ and $R^2$ is $C_2H_5$ which are described as individual components in two dye mixtures of GB 2,108,141.

It has now been found, surprisingly, that the dye of the formula I according to the present invention is significantly superior to the prior art dyes of the formula II in important dyeing properties, such as build-up or exhaustion, and in important fastness properties, for example fastness to dry heat setting and pleating and light fastness.

The dye of the present invention is prepared by subjecting an azo dye of the formula III

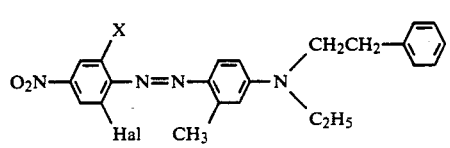

where X is cyano, bromine or chlorine, preferably bromine, and Hal is bromine or chlorine, preferably bromine, in a conventional manner, for example as described in DE-A-1809920, DE-A-1809921, GB-B-1184825, DE-B-1544563, DE-A-2310745, DE-B-2456495, DE-B-2610675, DE-A-2724116, DE-A-2724117, DE-A-2834137, DE-A-2341109, US-A-3821195, DE-A-2715034 or DE-A-2134896 to a nucleophilic displacement reaction using the cyanide ion $CN^\ominus$ as the nucleophilic agent. In this reaction, Hal in the dye of the general formula III is replaced by CN.

The solvents used for the displacement reaction are inert organic solvents, for example nitrobenzene or glycol or diglycol monomethyl or monoethyl ethers or mixtures of such solvents with one another and with tertiary organic nitrogen bases, dipolar aprotic solvents, for example N-methylpyrrolidone, pyridine, dimethylformamide, dimethyl sulphoxide or dicyanodialkyl thioethers. Other suitable media for the displacement reaction are water or aqueous systems consisting of water and a waterimmiscible organic solvent, for example nitrobenzene, preferably in the presence of a wetting or dispersing agent or of a known phase transfer catalyst, or of water and a water-soluble, inert organic solvent, such as ethylene glycol or dimethylformamide.

Another favourable factor for the displacement reaction is the presence of organic, basic nitrogen compounds, for example pyridine and pyridine bases.

The temperatures for the displacement reaction are normally between 20° and 150° C.

The nucleophilic agent $CN^\ominus$ is added to the reaction in the form of a simple or complex metal cyanide, for example an alkali metal or alkaline earth metal cyanide, zinc cyanide, alkali metal cyanozincate or cyanoferrate, but preferably in the form of copper(I) cyanide or of a system which forms copper(I) cyanide. It is particularly advantageous to use a combination of alkali metal cyanide with copper(I) cyanide for which the weight ratio of alkali metal and copper salt can be varied within wide limits.

The customary range for the weight ratio of alkali metal cyanide:copper(I) cyanide is from 5:95 to 95:5. Even outside these limits the positive mutual effect of the components is still detectable. It is also possible of course to replace the copper(I) cyanide in turn by a system which forms copper(I) cyanide, for example a combination of an alkali metal cyanide with another copper salt, preferably copper(I) salt, for example a copper(I) halide.

The dyes of the formula III required for preparing the dye of the present invention can be prepared by coupling a diazonium compound of an aromatic amine of the general formula IV

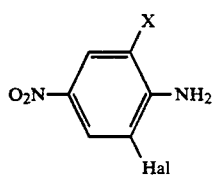

where X is cyano, chlorine or bromine and Hal is chlorine or bromine to a coupling component of the formula V

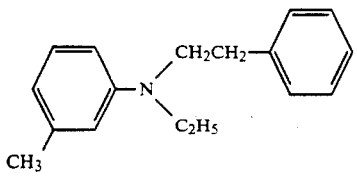

(V)

in a conventional manner.

From the amines of the general formula V the diazonium compounds are obtained in a conventional manner by the action of nitrous acid or other systems which form nitrosonium ions in a mineral acid or in aqueous medium acidified with a mineral acid, a lower alkanecarboxylic acid, for example formic acid, acetic acid or propionic acid, or mixtures thereof at temperatures of from $-15°$ C. to 40° C.

The coupling is likewise effected in a conventional manner by combining the diazonium solution obtained with a solution of the coupling component at temperatures of from 0° to 40° C., preferably from 0° to 25° C., in a suitable solvent, for example alkanol of from 1 to 4 carbon atoms, dimethylformamide, preferably in water acidified with sulphuric acid, hydrochloric acid or phosphoric acid, or a water-free or water-containing lower alkanecarboxylic acid or a lower alkanecarboxylic acid mixture.

In some cases it can be advantageous to buffer the pH during the coupling, for example by addition of sodium acetate. The coupling is complete after a few hours, and the dye of the formula II can be isolated and dried in a conventional manner.

The required coupling component of the formula V is known. It can also be prepared from known commercial products by known methods.

The dye of the present invention is highly suitable either alone or mixed with other disperse dyes for dyeing and printing hydrophobic synthetic materials. Suitable hydrophobic synthetic materials are for example cellulose acetate, cellulose triacetate, polyamides and high molecular weight polyesters. Preferably, the dye of the present invention is used for dyeing and printing materials composed of high molecular weight polyesters, in particular those based on polyethylene terephthalates, or blends thereof with natural fiber materials, or materials made of cellulose triacetate.

The hydrophobic synthetic materials can be present in the form of sheetlike or threadlike structures, having been processed for example into yarns or woven or knitted textile fabrics.

The dyeing of the fiber material mentioned with the dye of the present invention can be effected in a conventional manner, preferably from aqueous suspension, in the presence or absence of carriers, between 80° and about 110° C. by the exhaust method or by the HT method in a dyeing autoclave at from 110° to 140° C., and by the thermofixing process whereby the material is padded with the dyeing liquor and subsequently fixed at about 80° to 230° C.

The printing of the materials mentioned can be effected in a conventional manner by incorporating the dye of the present invention into a print paste and treating the material printed therewith at temperatures between 80° and 230° C. with HT steam, pressure steam or dry heat in the presence or absence of a carrier to fix the dye.

This produces very strong brilliant blue dyeings and prints having very good fastness properties, in particular a good fastness to dry heat setting and pleating and good light fastness.

The dye of the present invention is also suitable for dyeing the above-cited hydrophobic materials from organic solvents by the methods known for this purpose. In the dyeing liquors and print pastes used in the above applications, the dye of the present invention should be present in a very finely dispersed form. The fine dispersion of the dye is effected in a conventional manner by suspending the as-prepared dye together with dispersants in a liquid medium, preferably in water, and subjecting the mixture to the action of shearing forces, which will mechanically reduce the size of the dye particles originally present to such an extent as to obtain an optimum specific surface area and thus to minimise the sedimentation of the dye. The particle size of the dyes is in general between 0.5 and 5 $\mu$m, preferably about 1 $\mu$m.

The dispersants used in the milling process can be nonionic or anionic. Nonionic dispersants are for example reaction products of alkylene oxides, for example ethylene oxide or propylene oxide, with alkylatable compounds, for example fatty alcohols, fatty amines, fatty acids, phenols, alkylphenols and carboxamides. Anionic dispersants are for example ligninsulphonates, alkane- or alkylarene-sulphonates or alkylaryl polyglycol ether sulphates.

The dye preparations thus obtained should be pourable for most applications. For this reason the dye and dispersant content is limited in these cases. In general, dispersions are standardised to a dye content of up to 50 per cent by weight and to a dispersant content of about 25%. For economic reasons the dye content is usually not lower than 15 per cent by weight.

The dispersions may additionally contain further auxiliaries, for example those which act as oxidising agents, e.g. sodium m-nitrobenzenesulphonate, or fungicidal agents, for example sodium o-phenylphenolate and sodium pentachlorophenolate, and in particular acid donors, for example butyrolactone, monochloroacetamide, sodium chloroacetate, sodium dichloroacetate, the sodium salt of 3-chloropropionic acid, half-esters of sulphuric acid, for example lauryl sulphate, sulphuric esters of ethoxylated and propoxylated alcohols, for example butylglycol sulphate The dye dispersions thus obtained are usable with great advantage for making up print pastes and dyeing liquors They offer particular advantages for example in continuous processes where the dye concentration of the dyeing liquors must be kept constant by the continuous feeding of dye into the running apparatus.

Powder formulations are preferred for certain applications. These powders contain the dye or the dye mixture, dispersants and other auxiliaries, for example wetting, oxidising, preserving and dustproofing agents, and the abovementioned acid donors.

A preferred method for preparing pulverulent dye preparations consists in removing the liquid from the above-described liquid dye dispersions, for example by vacuum drying, freeze drying, by drying on drum dryers, but preferably by spray drying.

To prepare the dyeing liquors, the requisite amounts of the dye formulations prepared as described above are diluted with the dyeing medium, preferably water, to such an extent as to produce a liquor ratio of from 5:1 to 50:1 for the dyeing. Additionally, the liquors generally contain further dyeing assistants, such as dispersing, wetting and fixing aids. By adding organic and inorganic acids such as acetic acid, succinic acid, boric acid or phosphoric acid a pH is set of from 4 to 5, preferably 4.5. It is advantageous to buffer the set pH and to add an adequate amount of buffer system. An advantageous buffer system is for example the system acetic acid/sodium acetate.

If the dye is to be used for textile printing, the required amounts of the dye formulations are kneaded in a conventional manner together with thickeners, for example alkali metal alginates or the like, and with or without further additives, for example fixation accelerants, wetting agents and oxidising agents, to give print pastes.

The invention is further illustrated by the following example. Percentages are by weight.

EXAMPLE 1 a) 54.6 g of the dye of the formula VI

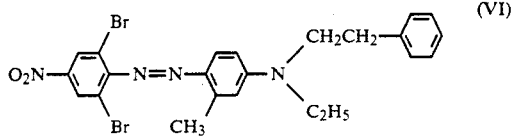

are added at from 70° to 75° C. to a suspension of 100 ml of dimethyl sulphoxide, 2.1 g of sodium cyanide and 7.1 g of copper(I) cyanide and the mixture is stirred at that temperature for 30 minutes. The temperature is then raised to 110° C. in the course of 30 minutes and the batch is then slowly stirred until cold and filtered with suction, and the filter residue is washed with 45 ml of dimethyl sulphoxide, 7.5% aqueous ammonia solution and water and dried under reduced pressure. This gives 39.8 g of the dye of the formula I, which has an absorption maximum of 602 μm and forms a blue solution in o-dichlorobenzene.

The dye VI used in the above stage a) can be prepared as follows:

b) 277.3 g of diethyl sulphate are added dropwise with stirring at 60° C. to a mixture of 217.6 g of N-phenethyl-3-methylaniline, 900 ml of ethanol and 138 g of potash in the course of 3 h. The mixture is subsequently stirred at 50° C. for 1 h, the salt is filtered off and washed with ethanol, and the ethanol is distilled off.

Yield: 217.1 g of N-ethyl-N-phenethyl-3-methylaniline.

c) The product obtained in stage b) is dissolved in 3 l of icewater and 1,450 ml of hydrochloric acid together with 8 g of sulphamic acid and admixed at from 0° to 5° C., by stirring, with a diazonium solution added dropwise and prepared as follows: 151.7 g of 2,5-dibromo-4-nitroaniline are added to a mixture of 67.2 g of ice and 336 g of sulphuric acid at from 10 to 15° C. 160.3 g of nitrosylsulphuric acid are then added dropwise, again at from 10° to 15° C., in the course of 2 h.

During the dropwise addition of the diazonium salt solution to the solution of the coupling component, the temperature is maintained at from 0° to 5° C. by the addition of 5.5 kg of an ice/water mixture.

After the diazonium solution has been added, the mixture is subsequently stirred for 1 h, at which point the dye is filtered off with suction, washed neutral and dried.

EXAMPLE 2

0.6 g of the dye of Example 1a are stirred in finely dispersed form into 2,000 g of water. The dispersion is brought to pH 4.5 with acetic acid and sodium acetate and admixed with 2.0 g of a commercial dispersant based on a naphthalenesulphonic acid-formaldehyde condensate.

The dyeing liquor thus prepared is entered with 100 g of a polyester fabric based on polyethylene terephthalate for dyeing at 130° C. for 1 h.

Subsequent rinsing, reduction clearing with 0.2% strength sodium dithionite solution at from 70° to 80° C. for 15 min, rinsing and drying gives a strong blue dyeing having very good colouristic properties, in particular very good fastness to dry heat setting and pleating.

EXAMPLE 3

20 g of the dye of Example 1a are incorporated in finely divided form in a print paste containing 45.0 g of carob bean flour, 6.0 g of sodium 3-nitrobenzenesulphonate and 3.0 g of citric acid per 100 g. If polyester is printed with this print paste and the printed fabric, after drying, is steamed for 15 min at a steam gauge pressure of 1.5, soaped, rinsed again and dried, this produces a strong blue print having very good colouristic properties.

I claim:

1. Monoazo dye of the formula I

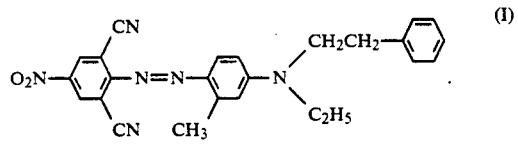

* * * * *